US008669718B2

(12) United States Patent
Yamamoto et al.

(10) Patent No.: US 8,669,718 B2
(45) Date of Patent: Mar. 11, 2014

(54) LIGHTING DEVICE AND ILLUMINATION APPARATUS USING SAME

(75) Inventors: Masafumi Yamamoto, Kyoto (JP); Katunobu Hamamoto, Osaka (JP); Hiroyuki Asano, Hyogo (JP); Hisaya Takikita, Osaka (JP); Hiroyuki Nakagawa, Hyogo (JP); Yuji Yoshimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/541,044

(22) Filed: Jul. 3, 2012

(65) Prior Publication Data

US 2013/0026949 A1  Jan. 31, 2013

(30) Foreign Application Priority Data

Jul. 26, 2011  (JP) .................................. 2011-162873

(51) Int. Cl.
  *H05B 37/02*  (2006.01)
(52) U.S. Cl.
  USPC ............................ 315/291; 315/299; 315/307
(58) Field of Classification Search
  USPC ......... 315/160, 172, 186, 193, 224, 291, 297, 315/299–302, 307–308
  See application file for complete search history.

(56) References Cited

U.S. PATENT DOCUMENTS

| 8,138,679 B2 * | 3/2012 | Konishi et al. ............ 315/185 R |
| 2011/0101875 A1 * | 5/2011 | Okawa et al. ............ 315/185 R |

FOREIGN PATENT DOCUMENTS

| JP | 2009-43447 | 2/2009 |
| JP | 2010-287499 | 12/2010 |

* cited by examiner

*Primary Examiner* — Douglas W Owens
*Assistant Examiner* — Henry Luong
(74) *Attorney, Agent, or Firm* — Renner, Otto, Boisselle & Sklar, LLP

(57) ABSTRACT

An LED lighting device includes: a power source unit for supplying the DC output voltage to a light-emitting diode; a control unit for adjusting the DC output voltage; and a control power source unit for supplying a control power to the control unit. The control power source unit generates the control power with the DC output voltage and has: a current-limiting resistor for limiting an electric current that flows from the power source unit to the control unit; a constant voltage unit for converting a voltage to be applied to the control unit through the current-limiting resistor unit to a constant voltage; and a switching unit for switching a resistance value of the current-limiting resistor unit among a plurality of resistance values.

4 Claims, 3 Drawing Sheets

LIGHTING DEVICE AND ILLUMINATION APPARATUS USING SAME

FIELD OF THE INVENTION

The present invention relates to an LED lighting device that lights a light-emitting diode (LED) and an illumination apparatus using same.

BACKGROUND OF THE INVENTION

Recently, LEDs have come into use as light sources for lighting in lieu of fluorescent lamps. For example, an LED lamp which is shaped like a conventional fluorescent lamp of a straight tube type is disclosed in Japanese Patent Application Publication No. 2009-43447. The LED lamp includes: a light source block having a structure in which a plurality of LEDs are mounted on a mounting substrate of a band plate shape; a glass tube of a straight tube type which stores the light source block therein; pin bases that block up both ends of the glass tube; and terminal pins that project from a side surface of the caps to feed a power to the light source block. Such an LED lamp is freely detachably mounted in a lamp socket provided in a dedicate illumination apparatus and is lit by the power (DC power) being supplied via the lamp socket from an LED lighting device that is mounted on the illumination apparatus.

Moreover, as a conventional LED lighting device, a power source device for lighting is disclosed in Japanese Patent Application Publication No. 2010-287499 (JP2010-287499A). The conventional example includes a power source unit which includes a DC/DC converter of a flyback type, a control circuit (control IC) that controls a switching element of the power source unit, and first and second auxiliary power source circuits that supply a control power to the control circuit.

An input voltage of the power source unit is a ripple voltage which is a full-wave rectified voltage of an AC voltage of a commercial AC power source. The power source unit supplies a direct-current (DC) voltage which is stepped down from the input voltage to an LED. The first auxiliary power source circuit includes a first electrolytic capacitor charged by an input voltage of the power source unit via a current-limiting resistor, and generates a control power with the electric charge charged in the first electrolytic capacitor.

On the other hand, the second auxiliary power source circuit includes a second electrolytic capacitor charged by an induced electromotive force which is induced to an auxiliary coil of a transformer that forms the power source unit and generates a control power with the electric charge charged in the second electrolytic capacitor. In addition, the power source unit further includes a diode of which an anode is connected with a positive electrode of the first electrolytic capacitor and a cathode is connected with a power source terminal of the control circuit and a positive electrode of the second electrolytic capacitor. Moreover, an electrical discharge from the second electrolytic capacitor to the first electrolytic capacitor is prohibited.

In the conventional example disclosed in JP2010-287499A, when the control power is supplied from the first auxiliary power source circuit immediately after supplying a power, and a voltage between both ends of the second electrolytic capacitor exceeds a voltage between both ends of the first electrolytic capacitor owing to the rise in an output voltage of the power source unit, a control power is supplied from the second auxiliary power circuit. In addition, since the operation of the first auxiliary power circuit is stopped while the control power is supplied by the second auxiliary power circuit, the power loss due to the current-limiting resistor can be suppressed.

However, as for light-emitting diode chips used for LED lamps, there are many kinds which differ in forward voltage. Therefore, even if LED lamps output a same optical power, their rated voltages (load voltages) are different when they use different kinds of light-emitting diode chips or include different numbers of light-emitting diode chips. For example, the rated voltage of a 20-type light-emitting diode is specified in a wide range of 22.5 volts to 47.5 volts in JEL801 "L-shape pin base GX16t-5-attached tubular LED lamp system (for general lighting)" which is standardized by Japan Electric Lamp Manufactures Association (JELMA). That is, the output voltage of the LED lighting device that lights such an LED lamp needs to cover the wide range of voltage of from 22.5 volts to 47.5 volts.

Accordingly, when the second auxiliary power circuit supplies the control power of the control circuit, the winding number of an auxiliary coil needs to be increased when the rated voltage Vf of the LED lamp is low (e.g., Vf=22.5 volts) and the control voltage Vcc of the control circuit is high (e.g., Vcc=15 volts). However, when the winding number of the auxiliary coil is increased and, as a result, the ratio of a primary coil and the auxiliary coil approximates 1:1, a problem arises in which the effect of the coupling coefficient of the primary coil and the auxiliary coil remarkably appears and an oscillatory waveform of a frequency higher than an operating frequency is superimposed on the waveform of the electric current that flows to a switching element connected with the primary coil.

On the other hand, when the first auxiliary power supply circuit supplies the control power for the control circuit, especially in a case in which a power factor improving circuit (a step-up copper circuit) is used, a circuitry part which can endure a high voltage of hundreds of volts needs to be used. This leads to an increase in the manufacturing cost. Moreover, there is also another problem in that the power loss increases due to the current-limiting resistor.

SUMMARY OF THE INVENTION

In view of the above, the present invention provides an LED lighting device and an illumination apparatus using same to cover a wide range of load voltages while suppressing an increase in manufacturing cost and power loss.

In accordance with an aspect of the present invention, there is provided an LED lighting device including: a power source unit for stepping down a DC input voltage to a predetermined DC output voltage and supplying the DC output voltage to a light-emitting diode; a control unit for adjusting the DC output voltage by controlling the power source unit; and a control power source unit for supplying a control power to the control unit.

The control power source unit generates the control power based on the DC output voltage from the power source unit. The control power source unit has: a current-limiting resistor for limiting an electric current that flows from the power source unit to the control unit; a constant voltage unit for converting a voltage to be applied to the control unit through the current-limiting resistor unit to a constant voltage; and a switching unit for switching a resistance value of the current-limiting resistor unit among a plurality of resistance values. The switching unit switches the resistance value of the current-limiting resistor unit to a smaller resistance value as the DC output voltage decreases.

The current-limiting resistor unit may be formed of a parallel circuit of a plurality of resistors, and the switching unit may has a switching element connected in series with one of the resistors and a driving unit which closes the switching element when the DC output voltage is not higher than a predetermined threshold value and opens the switching element when the DC output voltage is higher than the predetermined threshold value.

In accordance with another aspect of the present invention, there is provided an illumination apparatus including: the LED lighting device described above; and a main body for holding the LED lighting device and the light-emitting diode.

The LED lighting device and the illumination apparatus in accordance with the aspect of the present invention has an effect of covering a wide range of load voltages while suppressing increases in manufacturing cost and power loss.

BRIEF DESCRIPTION OF THE DRAWINGS

The objects and features of the present invention will become apparent from the following description of preferred embodiments given in conjunction with the accompanying drawings, in which:

FIGS. 1A and 1B illustrate an LED lighting device in accordance with an embodiment of the present invention, in which FIG. 1A is a circuitry block diagram and FIG. 1B is a circuit diagram of a control power source unit.

DETAILED DESCRIPTION OF THE EMBODIMENTS

Hereinafter, embodiments of the present invention will be described with reference to the drawings which form a part hereof.

Figure 1A:
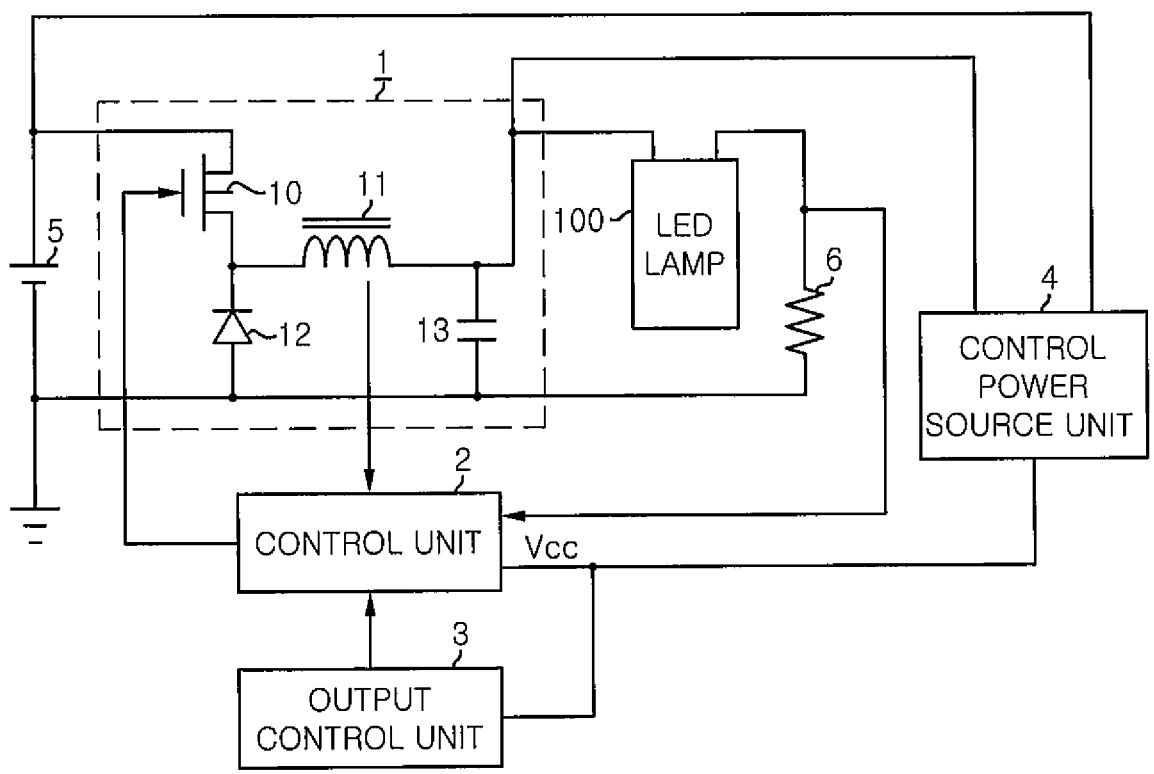

FIG. 1A is a schematic circuit diagram illustrating an LED lighting device in accordance with the embodiment of the present invention. The LED lighting device of the present embodiment includes a power source unit 1, a control unit 2 that controls the power source unit 1, an output control unit 3 that outputs a dimming instruction based on a dimming signal, which is transmitted from outside, to the control unit 2, and a control power source unit 4. In addition, in the present embodiment, an LED lamp which is described in the conventional art is presented as an example of a light-emitting diode which is lit by an LED lighting device, but the light-emitting diode is not limited thereto.

The power source unit 1 is configured by a well-known step-down chopper circuit and includes a series circuit of a switching element 10 and an inductor 11 inserted between a positive electrode of a DC power source 5 and a positive terminal (anode terminal) of an LED lamp 100, a rectifying diode 12, a smoothing capacitor 13, and a detecting resistor 6. As for the diode 12, the cathode thereof is connected with the drain of the switching element 10 formed of a field-effect transistor, and the anode thereof is connected with a negative electrode of the DC power source 5. The smoothing capacitor 13 is connected between a junction of the inductor 11 and the positive electrode of the LED lamp 100, and the negative electrode of the DC power source 5. For example, the DC power source 5 is configured with a step-up copper circuit that generates a DC voltage being higher than a commercial AC voltage from a commercial AC power source. The power source unit 1 steps down a DC input voltage supplied from the DC power source 5 to a predetermined DC output voltage to supply the DC output voltage to the LED lamp 100.

The output control unit 3 transmits to the control unit 2 an instruction which is a target value for an electric current (the load current flowing through the LED lamp 100) according to the dimming instruction. That is, when the dimming level of the dimming signal, which is inputted from the outside, is 100%, the output control unit determines the target value of the load current to the rated current value of the LED lamp 100. On the other hand, when the dimming level is 50%, the output control unit 3 determines the target value of the load current to half of the rated current.

The control unit 2 outputs a driving signal in a pulse form to the switching element 10 at the time when the electric current flowing through the inductor 11 becomes zero and stops outputting the driving signal at the time when the current (load current) flowing through the detecting resistor 6 is equal to the target value received from the output control unit 3. That is, the control unit 2 adjusts the DC output voltage supplied from the power source unit 1 by controlling the power source unit 1.

The control unit 2 and the output control unit 3 operate by using a control power Vcc supplied from the control power source unit 4. The control unit 2 performs a control operation in critical mode when the control power Vcc is 10 volts or higher, and the control operation of the control unit 2 is reset when the control power Vcc is lower than 10 volts. And, normally, the operation of the control unit 2 is stable when a control power Vcc of about 15 volts is supplied. Further, the control unit 2 may be configured by a general-purpose control IC.

Figure 1B:
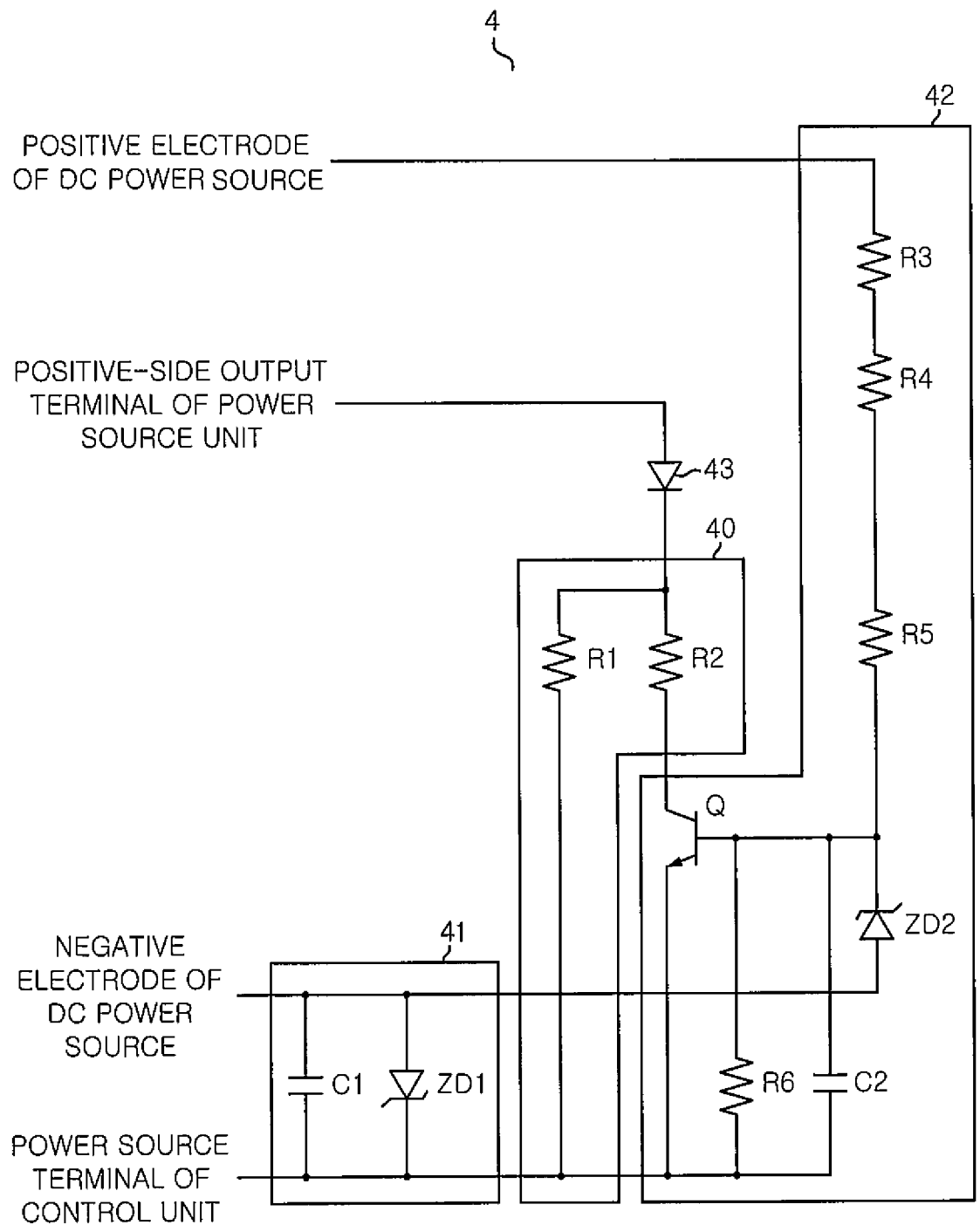

The control power source unit 4 generates the control power Vcc from the DC output voltage of the power source unit 1 and includes a current-limiting resistor unit 40, a constant voltage unit 41, and a switching unit 42 as illustrated in FIG. 1B. The current-limiting resistor unit is configured with a parallel circuit of two current-limiting resistors R1 and R2 connected between a positive-side output terminal (the positive electrode of the smoothing capacitor 13) of the power source unit 1 and a power source terminal of the control unit 2 via a rectifying diode 43 of which anode is connected to the positive-side output terminal of the power source unit 1.

Here, a resistance value of the current-limiting resistor R2 is set to be smaller than that of the current-limiting resistor R1.

The constant voltage unit 41 includes a Zener diode ZD1 of which cathode is connected with the power source terminal of the control unit 2 and anode is connected with the negative electrode (ground) of the DC power source 5 and a capacitor C1 which is connected in parallel with the Zener diode ZD1. Here, a Zener voltage of the Zener diode ZD1 is set to be equal to a voltage which is the same as the control power voltage (e.g., 15 volts) of the control unit 2. That is, the voltage (control power voltage) applied from the power source unit 1 to the power source terminal of the control unit 2 through the current-limiting resistor unit 40 is regulated into the Zener voltage (15 volts) of the Zener diode ZD1 in the constant voltage unit 41.

The switching unit 42 includes a switching element Q connected in series with the current-limiting resistor R2 and a driving unit that turns on/off the switching element Q. The switching element Q is configured with an NPN-type bipolar transistor, of which collector is connected with an end of the current-limiting resistor R2 and emitter is connected with the cathode of the Zener diode ZD1 in the constant voltage unit 41.

The driving unit includes resistors R3 to R6, a capacitor C2, a Zener diode ZD2 and the like. The driving unit closes (turns on) the switching element Q when the DC output voltage from the power source unit 1 is not higher than a predetermined threshold value and opens (turns off) the switching element Q when the DC output voltage is higher than the threshold value. A series circuit of the resistors R3, R4, and R5 is connected between the positive electrode of the DC power source 5 and a base of the switching element Q. A cathode of the Zener diode ZD2 is connected with the base of the switching element Q and an anode of the Zener diode ZD2 is connected with the negative electrode (ground) of the DC power source 5. Moreover, the base and the emitter of the switching element Q are connected with each other via a parallel circuit of the resistor R6 and the capacitor C2. Here, the Zener voltage of the Zener diode ZD2 preferably falls below the sum of an emitter voltage and a base-to-emitter voltage of the switching element Q, and is set to a voltage equal to or less than the control power voltage of the control unit 2 (e.g., 13 volts).

When the DC output voltage from the power source unit 1 is higher than the predetermined threshold value, for example, when the LED lamp 100 having a load voltage (rated voltage) of 47.5 volts is connected with the power source unit 1, the Zener diode ZD1 in the constant voltage unit 41 conducts, so that the control power voltage is maintained at the Zener voltage (15 volts). At this time, since the Zener diode ZD2 of the driving unit is supplied with the control power voltage to be conducted, the switching element Q is turned off. Accordingly, the electric current does not flow through the current-limiting resistor R2, but only flows through the current-limiting resistor R1.

On the other hand, when the DC output voltage from the power source unit 1 is not higher than the predetermined threshold value, for example, when the LED lamp 100 having a load voltage of 22.5 volts is connected with the power source unit 1 or when the power consumption in the control unit 2 or the output control unit 3 greatly increases, the DC output voltage of the power source unit 1 decreases so that the Zener diode ZD1 in the constant voltage unit 41 does not conduct, and a potential of the cathode of the Zener diode ZD2 connected with the base of the switching element Q decreases so that the Zener diode ZD2 also does not conduct. When the Zener diode ZD2 does not conduct, the switching element Q is turned on. Therefore, the current comes to flow through the current-limiting resistor R2 as well as through the current-limiting resistor R1. That is, since the switching element Q is turned on, the resistance value of the current-limiting resistor unit 40 decreases from a resistance value of the current-limiting resistor R1 to a combined resistance value of two current-limiting resistors R1 and R2. As a result, the electric current that flows from the power source unit 1 to the constant voltage unit 41 increases, so that a sufficient power can be supplied from the control power source unit 4 to the control unit 2 or the output control unit 3.

As described above, in the LED lighting device in accordance with the present embodiment, as the DC output voltage from the power source unit 1 (the load voltage of the LED lamp 100) decreases, the resistance value of the current-limiting resistor unit 40 can be switched to a low value. Accordingly the LED lighting device in accordance with the present embodiment can be used in a wide range of load voltages. Moreover, since the control power source unit 4 generates the control power from the DC output voltage not from the DC power source 5 but from the power source unit 1, circuitry parts for a high breakdown voltage need not be used. This suppresses an increase in manufacturing cost and an increase of the power loss due to the current-limiting resistors R1 and R2.

In the above description, the control unit 2 performs the critical mode control. However, the control unit 2 may perform a control in which the frequency of the driving signal is stable. Moreover, an N-type field-effect transistor may be used for the switching element Q. In this case, the Zener voltage of the Zener diode ZD2 is set to fall below the sum of a source voltage and a gate-to-source voltage of the switching element Q.

Figure 2:
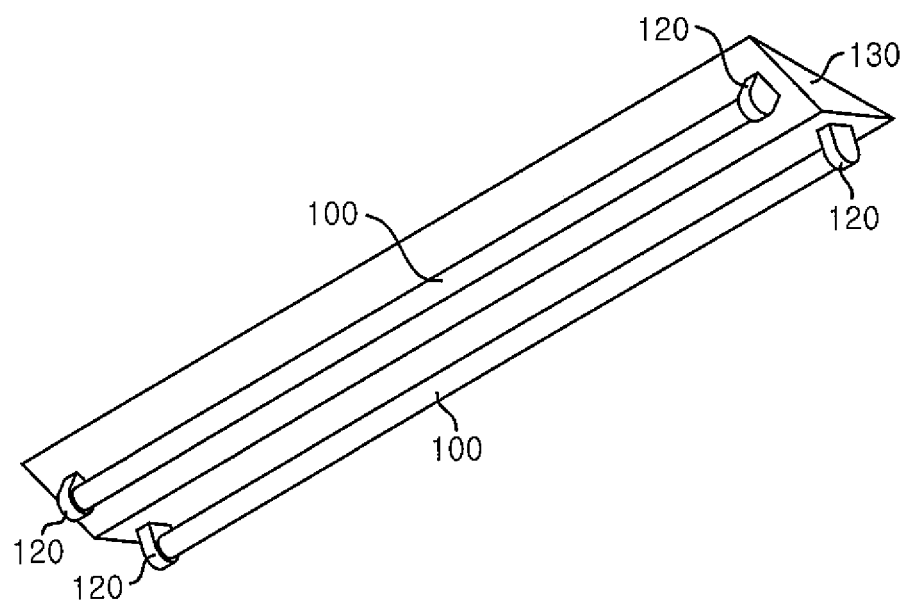
FIG. 2 is a perspective view illustrating an illumination apparatus in accordance with the present invention.

Further, the LED lighting device of the present embodiment is mounted in an illumination apparatus shown in FIG. 2 by way of example. This illumination apparatus includes a main body 130 to be directly attached to a ceiling, and two pairs of lamp sockets 120 provided in the main body 130. The main body 130 is configured in an elongated triangular prism shape and stores the LED lighting device therein. The lamp sockets 120 are located at both ends of each of two inclined panels of the main body 130 in longitudinal direction, respectively. The straight tube type LED lamp 100 is attached to each pair of lamp sockets 120, respectively.

Although a preferred embodiment of the present invention has been described for illustrative purposes, those skilled in the art will appreciate that various modifications, additions and substitutions are possible without departing from the scope and spirit of the invention as disclosed in the accompanying claims.

While the invention has been shown and described with respect to the embodiments, it will be understood by those skilled in the art that various changes and modification may be made without departing from the scope of the invention as defined in the following claims.

What is claimed is:

1. An LED lighting device comprising:
   a power source unit for stepping down a DC input voltage to a predetermined DC output voltage and supplying the DC output voltage to a light-emitting diode;
   a control unit for adjusting the DC output voltage by controlling the power source unit; and
   a control power source unit for supplying a control power to the control unit, wherein
   the control power source unit generates the control power based on the DC output voltage from the power source unit,
   the control power source unit includes:
   a current-limiting resistor for limiting an electric current that flows from the power source unit to the control unit;
   a constant voltage unit for converting a voltage to be applied to the control unit through the current-limiting resistor unit to a constant voltage; and
   a switching unit for switching a resistance value of the current-limiting resistor unit among a plurality of resistance values, and
   the switching unit switches the resistance value of the current-limiting resistor unit to a smaller resistance value as the DC output voltage decreases.

2. The LED lighting device of claim 1, wherein
   the current-limiting resistor unit is configured with a parallel circuit of a plurality of resistors, and
   the switching unit includes a switching element connected in series with one of the resistors and a driving unit which closes the switching element when the DC output voltage is not higher than a predetermined threshold value and opens the switching element when the DC output voltage is higher than the predetermined threshold value.

3. An illumination apparatus comprising:
   the LED lighting device described in claim 1; and a main body for holding the LED lighting device and the light-emitting diode.

4. An illumination apparatus comprising:
the LED lighting device described in claim 2; and
a main body for holding the LED lighting device and the light-emitting diode.

* * * * *